US008051424B2

(12) United States Patent
Steinmann et al.

(10) Patent No.: US 8,051,424 B2
(45) Date of Patent: Nov. 1, 2011

(54) METHOD, COMPUTER PROGRAM PRODUCT AND COMPUTER DEVICE FOR PROCESSING DATA

(75) Inventors: Joerg Steinmann, Voelklingen (DE); Karthikeyan Ayyadurai, Bangalore (IN); Himanshu Kacker, Bangalore (IN); Mohan Marar, Bangalore (IN); Jayanta M. Boruah, Bangalore (IN); Wolfgang Gentes, Zweibruecken (DE)

(73) Assignee: SAP AG, Walldorf (DE)

( * ) Notice: Subject to any disclaimer, the term of this patent is extended or adjusted under 35 U.S.C. 154(b) by 1347 days.

(21) Appl. No.: 11/115,026

(22) Filed: Apr. 26, 2005

(65) Prior Publication Data
US 2005/0240683 A1     Oct. 27, 2005

(30) Foreign Application Priority Data

Apr. 26, 2004  (EP) .................................. 04009850

(51) Int. Cl.
*G06F 9/46* (2006.01)
*G06F 3/00* (2006.01)
*G06F 12/00* (2006.01)
(52) U.S. Cl. ............. 718/106; 718/108; 710/5; 710/200
(58) Field of Classification Search .................. 718/106, 718/108
See application file for complete search history.

(56) References Cited

U.S. PATENT DOCUMENTS

| 5,202,971 | A | 4/1993 | Henson et al. |
| 5,446,915 | A | 8/1995 | Pierce |
| 5,603,019 | A | 2/1997 | Kish |
| 5,682,537 | A | 10/1997 | Davies et al. |
| 5,689,699 | A | 11/1997 | Howell et al. |
| 5,752,031 | A * | 5/1998 | Cutler et al. .................. 718/103 |
| 5,761,667 | A | 6/1998 | Koeppen |
| 5,764,972 | A | 6/1998 | Croiuse et al. |
| 5,845,281 | A | 12/1998 | Benson et al. |
| 6,128,617 | A | 10/2000 | Lowry |

(Continued)

FOREIGN PATENT DOCUMENTS

DE     100 63412     7/2001

(Continued)

OTHER PUBLICATIONS

Chaudhuri, Surajit, et al, "An Overview of Data Warehousing and OLAP Technology," *SIGMOD Record*, SIGMOD, New York, USA, vol. 26, No. 1, Mar. 1997, pp. 65-74, XP002193792.

(Continued)

*Primary Examiner* — Kenneth Tang
(74) *Attorney, Agent, or Firm* — Fish & Richardson P.C.

(57) ABSTRACT

A computer system receives a data collection and creates an administration table. A main process locks the data collection against unauthorized access using an association, in a lock table, between it and a lock identifier required for data collection access by processes. The main process divides the data collection into subgroups. The lock identifier and each subgroup are forwarded to one of the processes; the subgroups being parallel processed by recipient processes that access and update the data collection using the lock identifier, and set the lock identifier and update the administration table regarding the processing done by the recipient process, the administration table being common to all of the subgroups. After the recipient processes, the data collection is unlocked by the main process by removing the association between the data collection and the lock identifier in the lock table.

7 Claims, 15 Drawing Sheets

U.S. PATENT DOCUMENTS

| | | | |
|---|---|---|---|
| 6,751,617 B1 * | 6/2004 | Anfindsen | 1/1 |
| 6,925,642 B1 * | 8/2005 | Commander | 718/104 |
| 7,085,825 B1 * | 8/2006 | Pishevar et al. | 709/221 |
| 7,461,144 B1 * | 12/2008 | Beloussov et al. | 709/223 |
| 2002/0046248 A1 | 4/2002 | Drexler | |
| 2002/0056075 A1 | 5/2002 | Hamilton et al. | |
| 2002/0124042 A1 * | 9/2002 | Melamed et al. | 709/102 |
| 2002/0184609 A1 | 12/2002 | Sells et al. | |
| 2002/0194196 A1 | 12/2002 | Weinberg et al. | |
| 2003/0004945 A1 | 1/2003 | Teng et al. | |
| 2003/0131204 A1 * | 7/2003 | Lin et al. | 711/152 |
| 2004/0039741 A1 | 2/2004 | Ulrich et al. | |
| 2005/0071843 A1 * | 3/2005 | Guo et al. | 718/101 |

FOREIGN PATENT DOCUMENTS

| | | |
|---|---|---|
| EP | 0458179 | 11/1991 |
| EP | 1217540 | 6/2002 |
| WO | 98/58331 | 12/1998 |
| WO | 03/012611 | 2/2003 |

OTHER PUBLICATIONS

Squire, Cass, "Data Extraction and Transformation for the Data Warehouse," *ACM Proceedings of SIGMOD, International Conference on Management of Data*, vol. 24, No. 1, Mar. 1, 1995, pp. 446-447, XP002091745.

White, Colin, "Data Warehousing: Cleaning and Transforming Data," INFO DB, Iowa City, USA, vol. 10, No. 6, Apr. 6, 1997, pp. 11-12, XP002091743.

White, Colin, "Managing Data Transformations," *Byte*, McGraw-Hill Inc., St. Petersborough, USA, Dec. 1, 1997, pp. 53-54, XP000728707.

Rahm, "Parallel Query Processing in Shared Disk Database Systems" *Sigmod Record*, vol. 22, No. 4 (Dec. 1993) pp. 32-37.

Härder, et al. "Concurrency Control Issued in Nested Transactions" VLDB Journal, 2(1) (1993) pp. 39-74.

Rahm, Erhard. "Parallel Query Processing in Shared Disk Database System." University of Kaiserslautern, Germany, *Sigmod Record*, vol. 22 (4): 32-37 (1993).

Harder and Rothermel. "Concurrency Control Issues in Nested Transactions." University of Kaiserslautern, Germany, VLDB Journal, vol. 2 (1):39-74 (1993).

\* cited by examiner

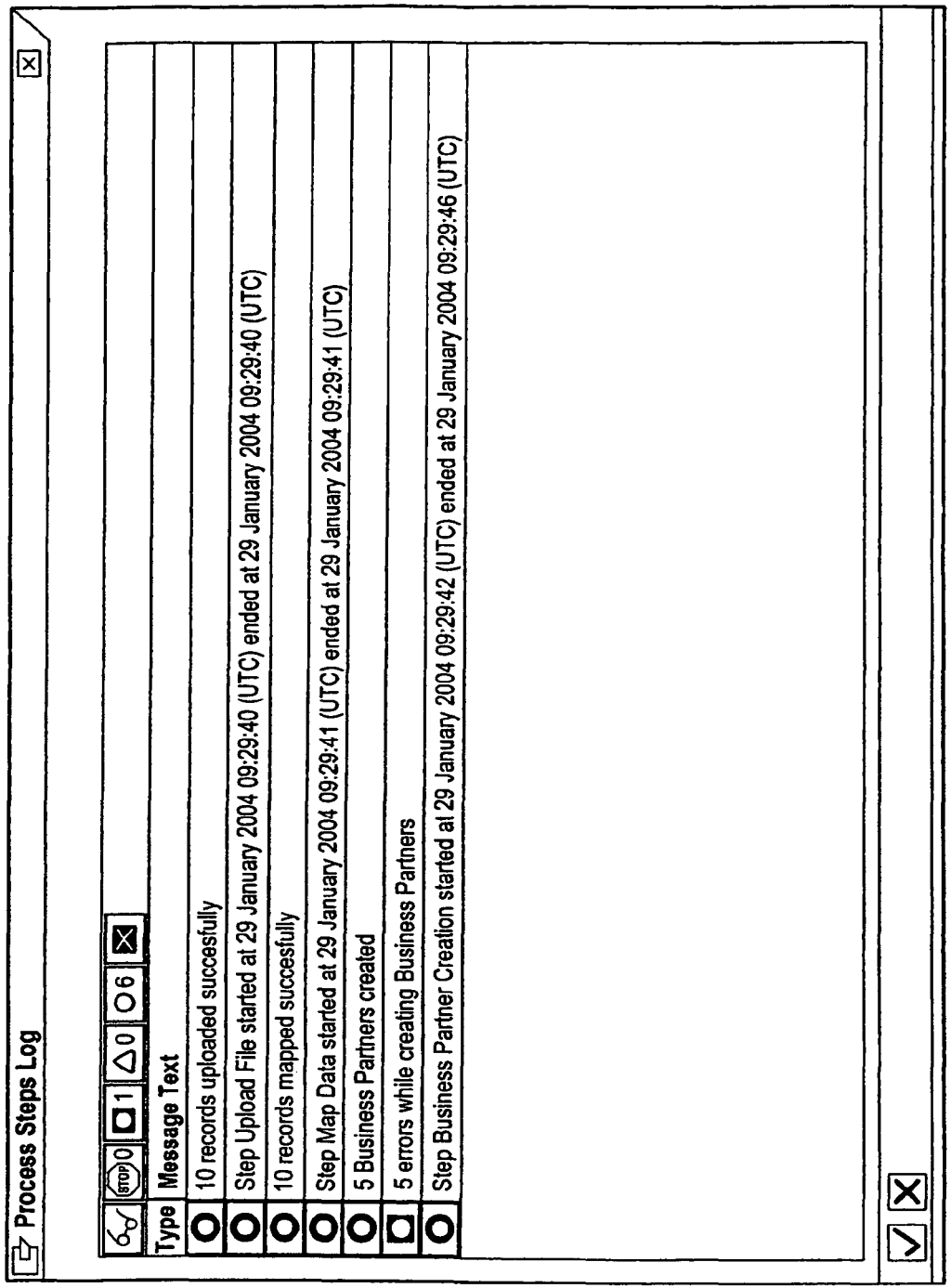

FIG. 3F

| Start Position | 1 | | | | | |
|---|---|---|---|---|---|---|
| Record Number | Record No | Field No | Msg type | Long Text | Error Msg | Data Rec |
| ▽ 1 | 0 | 0 | | | | Mr., Jame... |
| 0 | 1 | 0 | ◻ | | Telephone/fax code for country code USV is not maintained | |
| △ 7 | 0 | 0 | | | | Mr., Franz,... |
| △ 8 | 0 | 0 | | | | Mr., Josef,... |
| △ 9 | 0 | 0 | | | | Mr., Winfri... |
| △ 10 | 0 | 0 | | | | Mr., Johan... |

Error Analysis of Step Business Partner Creation

FIG. 3G

Display Address List: PERSON_LIST

Search / Favorites

Find
By: List ID
Description

Address List: PERSON_LIST
Description: List with persons

Basic Data / Process Steps / Text / Data after Mapping / Details

Start Position: 1

40

| Record No | Title | First Name | Last Na... | Second Forename or Middle Name | Date of Birth | Gender | Postal Code |
|---|---|---|---|---|---|---|---|
| 1 | 0002 | James | Edwards | T. | | | 12345 |
| 2 | 0002 | Leonard | McNeel | H. | | | 77777 |
| 3 | 0002 | Homer | Wilsom | J. | | | 98765 |
| 4 | 0002 | Hugh | Deep | | | | 98765 |
| 5 | 0002 | Bartholomew | Ozz | | | | 66763 |
| 6 | 0002 | Bernd | Gelb | | | | 66763 |
| 7 | 0002 | Franz | Franz | | | | 66763 |
| 8 | 0002 | Josef | Schwarz | | | | 66763 |
| 9 | 0002 | Winfried | Rot | | | | 66763 |
| 10 | 0002 | Johannes | Gelb | | | | 66763 |

METHOD, COMPUTER PROGRAM PRODUCT AND COMPUTER DEVICE FOR PROCESSING DATA

PRIORITY CLAIM

This application claims priority from European Patent Application No. 04009850.1, filed Apr. 26, 2004, the contents of which are incorporated herein by reference.

TECHNICAL FIELD

The present invention relates to a method and computer program product for processing data.

BACKGROUND

When large amounts of data are to be processed, the processing can be very time consuming. In order to reduce the time needed for processing, highly powerful equipment is needed raising costs.

SUMMARY

It is an object of the present invention to provide a method and computer program product for processing data which enable a more efficient use of the given system resources.

This object is solved according to the present invention by a method having the features disclosed in claim 1 and computer program product having the features disclosed in claim 6. Preferred embodiments are subject of the dependent claims.

According to the invention there is provided a method for processing data comprising the steps of:
  providing data to be processed;
  locking said data with a predetermined lock associated to the process processing said data to prevent access of other processes to data;
  dividing data to be processed into sub-groups, said sub-groups preferably containing different data;
  starting and/or calling at least two sub-processes;
  transmitting a sub-group of data to be processed by a respective sub-process and said lock to said respective sub-process;
  processing said data by said sub-processes substantially in parallel;
  unlocking said data when all sub-processes have finished processing the respective sub-group of data transmitted thereto.

Locking the data to be processed in particular comprises providing the data with a predefined marker which indicates that the respective data can only be accessed and/or processed by the owner of the lock, i.e. the process which possesses the ID of or associated to the lock. By transmitting different parts of the data and the lock to sub-processes, and thus processing the data substantially in parallel, the processing speed can be enhanced as the system resources can be used in a better way.

By the use of the lock it can be securely prevented that the same data is processed by different processes. As a consequence, the consistency of the data can be ensured.

After the all sub-processes have terminated processing the data, the data can be unlocked. This means that the predefined marker is removed and other processes can access the data again.

Preferably said locks are stored in a table, said table being accessible for all processes.

The method preferably further comprises the step of inputting the number of sub-processes to be used. Thus the method of parallel processing can be customized according to the particular needs.

The method can furthermore comprise the step of inputting the number of data/data sets to be processed by each sub-process.

Preferably the step of locking said data comprises a step of generating a lock and transmitting said lock to the process. The generated lock is stored in said generally accessible table.

According to the invention there is furthermore provided a computer program product for processing data comprising program parts for carrying out a method according to the invention or one of the preferred embodiments thereof.

Moreover, there is provided a computer device for processing data comprising:
  a storage medium for storing data to be processed;
  a processing means for
    locking said data with a predetermined lock associated to the process processing said data to prevent access of other processes to data;
    dividing data to be processed into sub-groups;
    starting/calling at least two sub-processes;
    transmitting a sub-group of data to be processed by a respective sub-process and said lock to said respective sub-process;
    processing said data by said sub-processes substantially in parallel;
    unlocking said data when all sub-processes have finished processing the respective sub-group of data transmitted thereto.

Further features and advantages will become apparent from the following detailed description of preferred embodiments of the present invention with reference to the drawings.

BRIEF DESCRIPTION OF THE DRAWINGS

FIGS. 3A-3H show screen-shots of a user interface for operating the table structure.

DESCRIPTION

Figure 1:
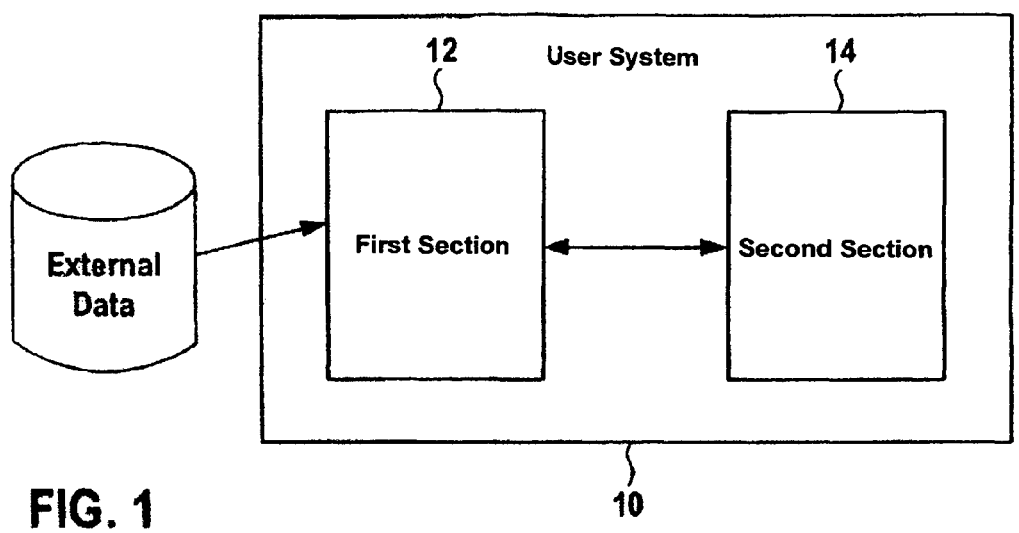
FIG. 1 schematically shows a system for importing an processing data.

A user system 10 for importing an processing data is schematically shown in FIG. 1. The user system 10 comprises a first section 12 which can be used for importing and processing external data. The user system furthermore comprises at least one second section 14 in which data contained in the user system is processed.

A table structure and method for importing and processing large amounts of data sets into said user system 10 will be described in the following. As a preferred embodiment, the importing and processing of address data in a system will be described hereinafter.

External data comprising a plurality of data sets to be imported into a system are provided on an electronic storage medium, like a CD, or are received via ISDN, email, and so on. The data sets are provided in a predefined format in a data file e.g. ASCII, Excel, or dBase. The data sets comprise data segments of different categories. For address data such categories could be first name, last name, street, house number, city, etc. The segments of a data set are separated by a separator in the data file. The separator can be e.g. comma, semicolon, tab or any other character.

Figure 2:
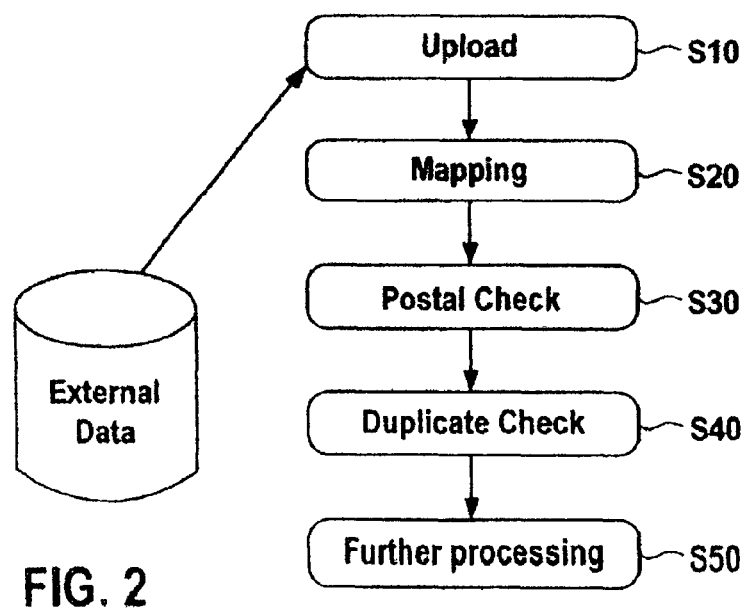
FIG. 2 shows a schematic overview of a method of uploading and processing data in a preferred table structure.

FIG. 2 shows a schematic overview of a method of uploading and processing data in a preferred table structure.

External data to be imported into the system are first uploaded without any further processing (step S10). The data sets uploaded in the user system are referred to as "data list". The uploaded data sets are mapped (step S20). In particular the data structure of the uploaded data sets is transferred to the data structure of the system (to be described later). After mapping the data sets several checks are performed on the data sets in order to verify if particular properties of the data sets are correct. In the present case, as address data sets are used, a postal check (step S30) and a duplicate check (step S40) are performed. In the postal check it is verified whether the address data provided is correct with respect to general properties, e.g. it is checked whether the postal code correctly corresponds to the city given in one data set.

During the duplicate check step, it is checked whether duplicate data sets, i.e. substantially identical data sets or data sets having a specified (predetermined or predeterminable) range of identical data fields are present. During this check it can be verified whether a newly imported data set is substantially identical to a data set already present in the system or whether two newly imported data sets are identical. The duplicate check can e.g. be performed by comparing the components of the one data set (last name, first name, street, . . . ) with the same components of another data set.

After having performed the various checks, the imported data sets can be further processed (step S50) as will be described later.

In the following, a table structure used for importing and processing data and/or data sets will hereinafter be referred to as a "staging area".

The staging area comprises a plurality of tables into which data segments of the imported data sets and/or additional information relating to the data list is written.

The external data stored on a data storage medium is read line by line (data set by data set) and stored in table CRMD_MKTLIST_C. During this step, the data is not processed in any way. This means that in CRMD_MKTLIST_C the data is stored in a form similar to the form of the provided data in the data file. The data segments separated by the separator are written into the table CRMD_MKTLIST_C substantially without an processing. Thus the data sets as a whole are transferred from the data storage medium to the table CRMD_MKTLIST_C without being split up into separate parts.

The data stored in CRMD_MKTLIST_C is then mapped. During the mapping step the data sets stored in CRMD_MKTLIST_C are each divided up, whereby one or more segments of each data set are stored e.g. in either of tables CRMD_MKTLIST_ADR, CRMD_MKTLIST_ORG, CRMD_MKTLIST_PER, CRMD_MKTLIST_CEN. In CRMD_MKTLIST_ADR data segments of each data set relating to address properties (e.g. street, postal code, city, . . . ) of the data sets are stored. In CRMD_MKTLIST_ORG data segments of each data set relating to the data set's organizational properties (e.g. company name, . . . ) are stored. In CRMD_MKTLIST_PER data segments of each data set relating to the person (e.g. first name, last name, age, sex, . . . ) are stored. In CRMD_MKTLIST_CEN data segments of each data set relating to containing additional information (e.g. contact person of a company, . . . ) are stored.

If the data sets relate to other types of data, other suitable tables can be used.

A table CRMD_MKTLIST_E is provided in which error messages for errors which occur during the processing of the data are logged.

Furthermore, there is provided a plurality of tables which form a so called "administrative area". In the present system the following tables are provided:
CRMD_MKTLIST_H
CRMD_MKTLIST_T
CRMD_MKTLIST_PH
CRMD_MKTLIST_S
CRMD_MKTLIST_L
CRMD_MKTLIST_I In CRMD_MKTLIST_H header information and attributes (e.g. origin of the data, type of the data, costs) relating to the list are stored. In CRMD_MKTLIST_T additional information (e.g. short description, language dependent) relating to the list is stored. In CRMD_MKTLIST_PH package header information and attributes is stored, e.g. the mapping format used or the name of the provided file containing the data sets to be imported. In CRMD_MKTLIST_S the steps which have already been processed for a specific data list are indicated. In CRMD_MKTLIST_L builds the connection between the header and the list itself. In particular a reference to CRMD_MKTLIST_H is stored in this table. In CRMD_MKTLIST_I a link or reference to a created data object (to be described later) is stored for each data set.

In the following, examples of the above mentioned tables are shown:

| Header table CRMD_MKTLIST_H | | |
| --- | --- | --- |
| Field | Data type/-element | Meaning |
| CLIENT | MANDT | Client |
| LIST_GUID | RAW16 | GUID of the list |
| LIST_ID | CHAR28 | ID of the list |
| LIST_ID_LOGSYS | CHAR10 | Logical system where the list was created |
| ORIGIN | CHAR6 | Origin of the list |
| TYPE | CHAR2 | Type of the list (bought, rented) |
| VALID_DATE_TO | DATS8 | Recommended End-of-Use Date |
| MAX_USAGE_NO | NUMC4 | Permitted No. of Uses for Address List |
| MAX_USAGE_DATE | DATS8 | Permitted End-of-Use Date |
| NO_GROSS | NUMC8 | Gross number |
| COSTS | CURR15 | Costs |
| COSTS_CURRENCY | CUKY5 | Currency of costs |
| CREATED_AT | DEC15 | Creation date |
| CREATED_BY | CHAR12 | Creation user |
| CHANGED_AT | DEC15 | Change date |
| CHANGED_BY | CHAR12 | Change user |
| DELETED | CHAR1 | Flag which indicates that list is deleted |
| APPL_LOG_ID | CHAR22 | ID of application log of deletion |

| Item table CRMD_MKTLIST_I | | |
| --- | --- | --- |
| Field | Data type/-element | Meaning |
| CLIENT | MANDT | Client |
| ITEM_GUID | RAW16 | GUID of the line |
| LIST_GUID | RAW16 | GUID of the list |
| BP_GUID_ORG | RAW16 | GUID of the assigned business partner (type organization) |

Item table CRMD_MKTLIST_I

| Field | Data type/-element | Meaning |
|---|---|---|
| BP_GUID_PER | RAW16 | GUID of the assigned business partner (type person) |
| POSTAL | CHAR1 | Flag that the entry has postal errors |
| DUPLICATE | CHAR1 | Flag that the entry is a duplicate |
| CLIENT | MANDT | Client |
| LIST_GUID | RAW16 | GUID of the list |
| LIST_LG | LANG1 | Language |
| LIST_DESCR | CHAR60 | Description |

Text table CRMD_MKTLIST_T

| Field | Data type/-element | Meaning |
|---|---|---|
| CLIENT | MANDT | Client |
| LIST_GUID | RAW16 | GUID of the list |
| LIST_LG | LANG1 | Language |
| LIST_DESCR | CHAR60 | Description |

Header table CRMD_MKTLIST_PH

| Field | Data type/-element | Meaning |
|---|---|---|
| CLIENT | MANDT | Client |
| PACKAGE_GUID | RAW16 | GUID of the package |
| SET_GUID | RAW16 | GUID of the profile set |
| SET_DESCRIPTION | CHAR72 | description of a profile set |
| EXISTING_SET | CHAR1 | |
| PF_GUID | RAW16 | GUID of a profile |
| TG_GUID | RAW16 | GUID of the target group |
| TG_DESCRIPTION | CHAR72 | description of a target group |
| MAPPING_FORMAT | CHAR6 | format of an external list |
| SEPARATOR_TYPE | CHAR1 | Field separator type |
| SEPARATOR_CHAR | CHAR1 | Field separator character |
| FILE | CHAR255 | Location of the file |
| FILE_STORAGE | CHAR1 | Storage place of file: workstation or server |

Package-List-Assignment table CRMD_MKTLIST_L

| Field | Data type/-element | Meaning |
|---|---|---|
| CLIENT | MANDT | Client |
| PACKAGE_GUID | RAW16 | GUID of the package |
| LIST_GUID | RAW16 | GUID of the list |

Package-Workflow-Steps-Assignment table CRMD_MKTLIST_S

| Field | Data type/-element | Meaning |
|---|---|---|
| CLIENT | MANDT | Client |
| PACKAGE_GUID | RAW16 | GUID of the package |
| STEP | CHAR1 | Step (U, M, P, D, B, T, C, R) |
| FLAG | CHAR1 | flag, which indicates that step is selected |

Package-Workflow-Steps-Assignment table CRMD_MKTLIST_S

| Field | Data type/-element | Meaning |
|---|---|---|
| STATUS | CHAR1 | defines, what the process status of the step is (active, finished or error) |
| ATTR_ERROR | CHAR1 | Determines, what the workflow has to do, if the step has an error (break or continue) |
| REPEAT_ALL | CHAR1 | Determines: wants the user to repeat the step for all entries in the list or only for the failed, if in the step occurs an error |
| APPL_LOG_ID | CHAR22 | Application Log: Handle of a protocol |

A graphical user interface for operating the staging area will be described with reference to FIGS. 3A to 3H.

The user interface comprises a field 30 for inputting an ID of a list to be created and a field 32 for inputting a description of the list. Furthermore, the user interface comprises a plurality of tab strips 34-42 for selecting specified input screens described hereinafter.

Figure 3A:
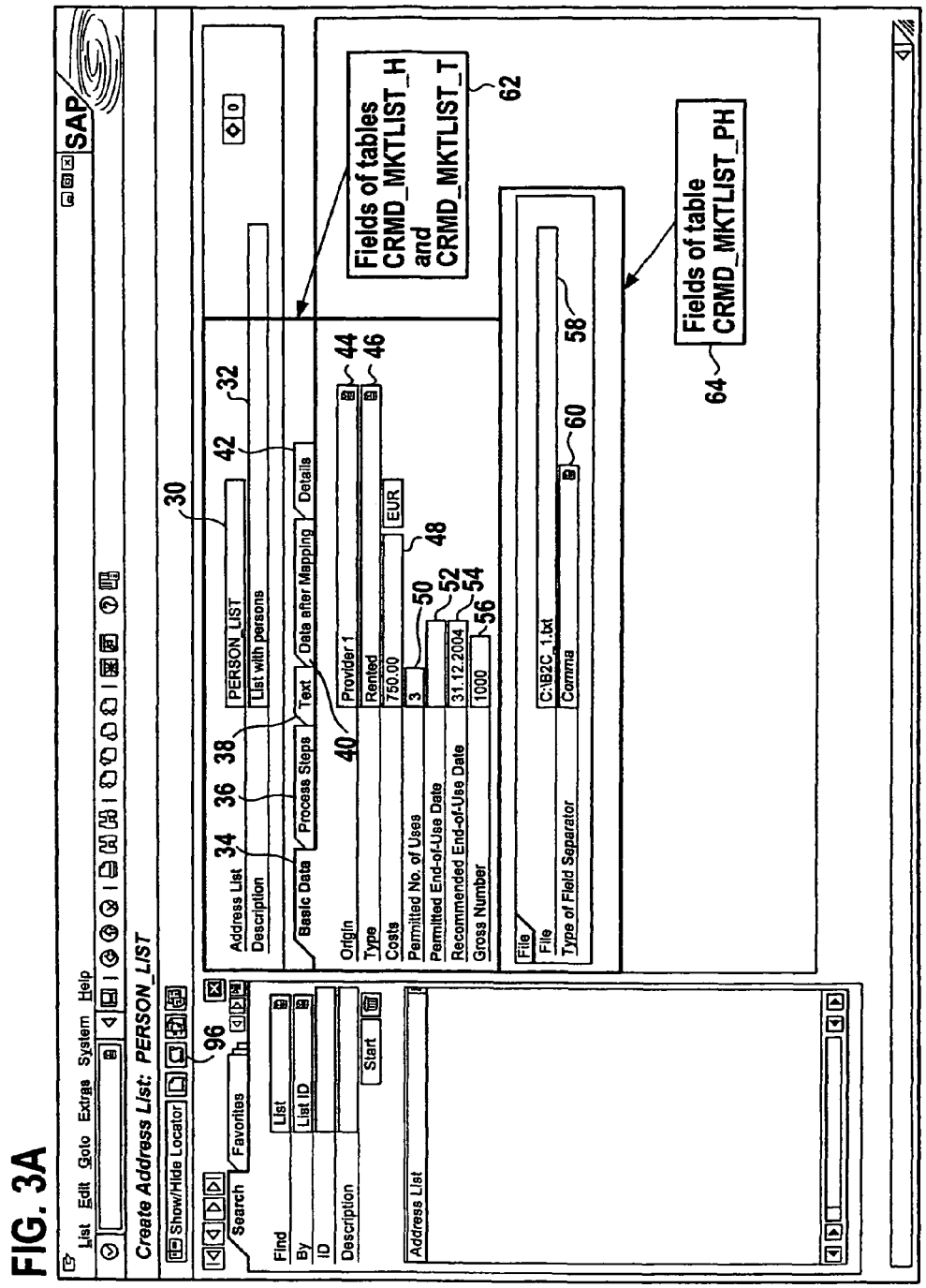

FIG. 3A shows a basic screen for inputting basic data relating to the data file to be uploaded.

If the user wants to upload a new data file he must create a new data list. The user enters an ID of the data list in field 30 (in the present case: PERSON_LIST) and a description of the list in field 32. On tab strip 32 the user enters or can enter attributes such as the origin in field 44, the type in field 46, the costs in field 48, the permitted number of uses in field 50 or permitted end of use date in field 52 (if the data sets can only be used for a predefined number of times and/or a predefined usage period, to be described later), recommended end of use date in field 54 and/or the gross number in field 56 (=number of expected data sets in the file). This information input in region 62 is stored in tables CRMD_MKTLIST_H and CRMD_MKTLIST_T.

Furthermore, the user enters the file name (with complete path) in field 58 and the field separator used in the data file to be imported (comma, semicolon, tab, other character) in field 60. A so called "package" is created and the information input in region 64 is stored in table CRMD_MKTLIST_PH.

Figure 3B:
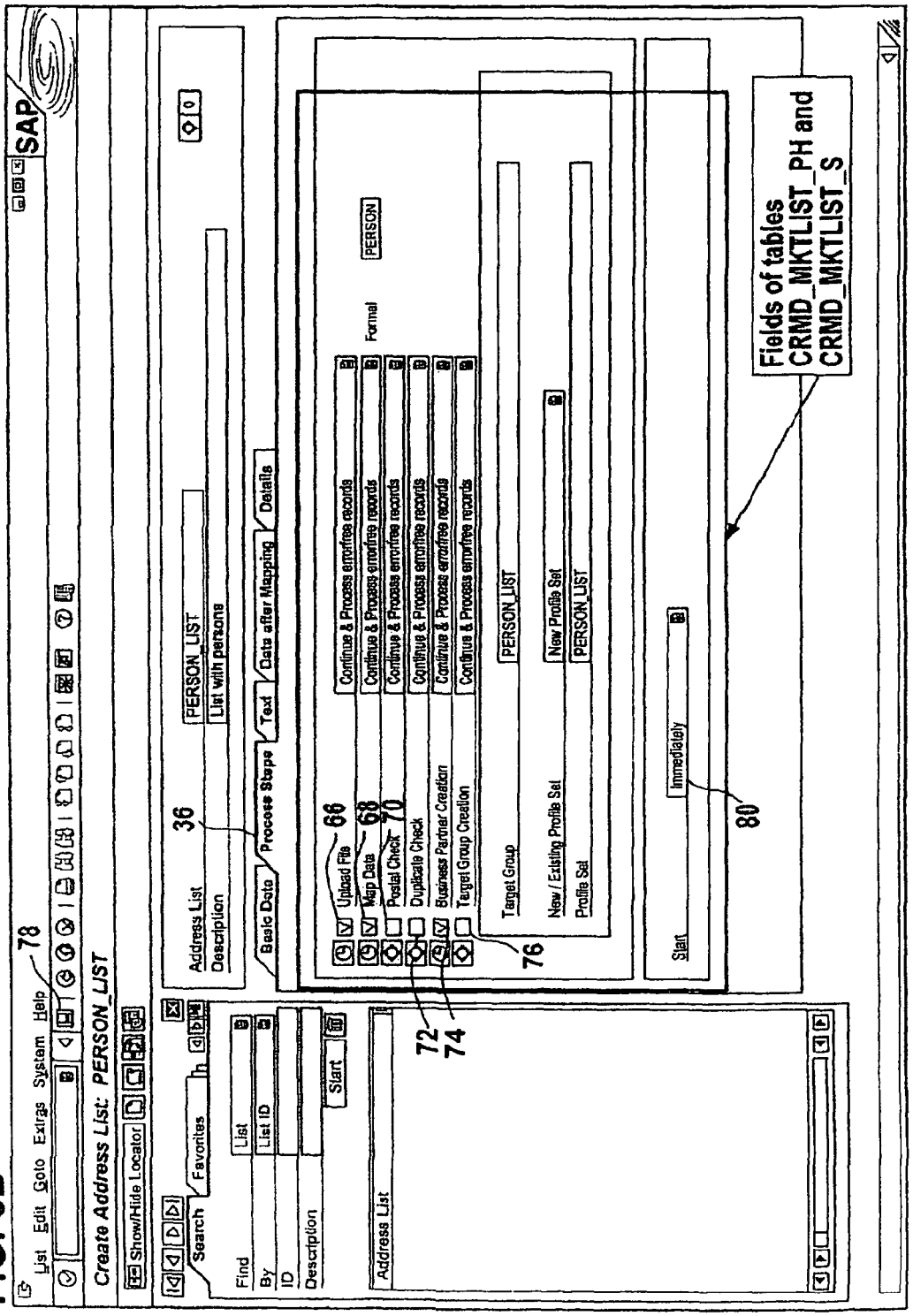

FIG. 3B shows a screen for inputting information relating to process steps to be performed.

On tab strip 36 the user can mark in the fields 68-74 the steps or processing that should be processed within one background job, i.e. in one run. In the shown screen, the user can select one, several or all of 'Upload File' (field 66), 'Map Data' (field 68), 'Postal Check' (field 70), 'Duplicate Check' (field 72), and two steps for further processing (fields 74, 76) ('Business Partner Creation' and 'Target Group Creation').

If the step 'Map Data' (field 68) is marked a mapping format must be given (to be described later).

The user can specify in field 80 the start type, i.e. whether the processing is to start immediately or at a specified later time.

If the user presses the save button 78, the entered data is saved.

The input data is then written into tables CRMD_MKTLIST_PH and CRMD_MKTLIST_L by the system. Table CRMD_MKTLIST_S contains all steps for the package, wherein the status of every step is initial.

Figure 3C:
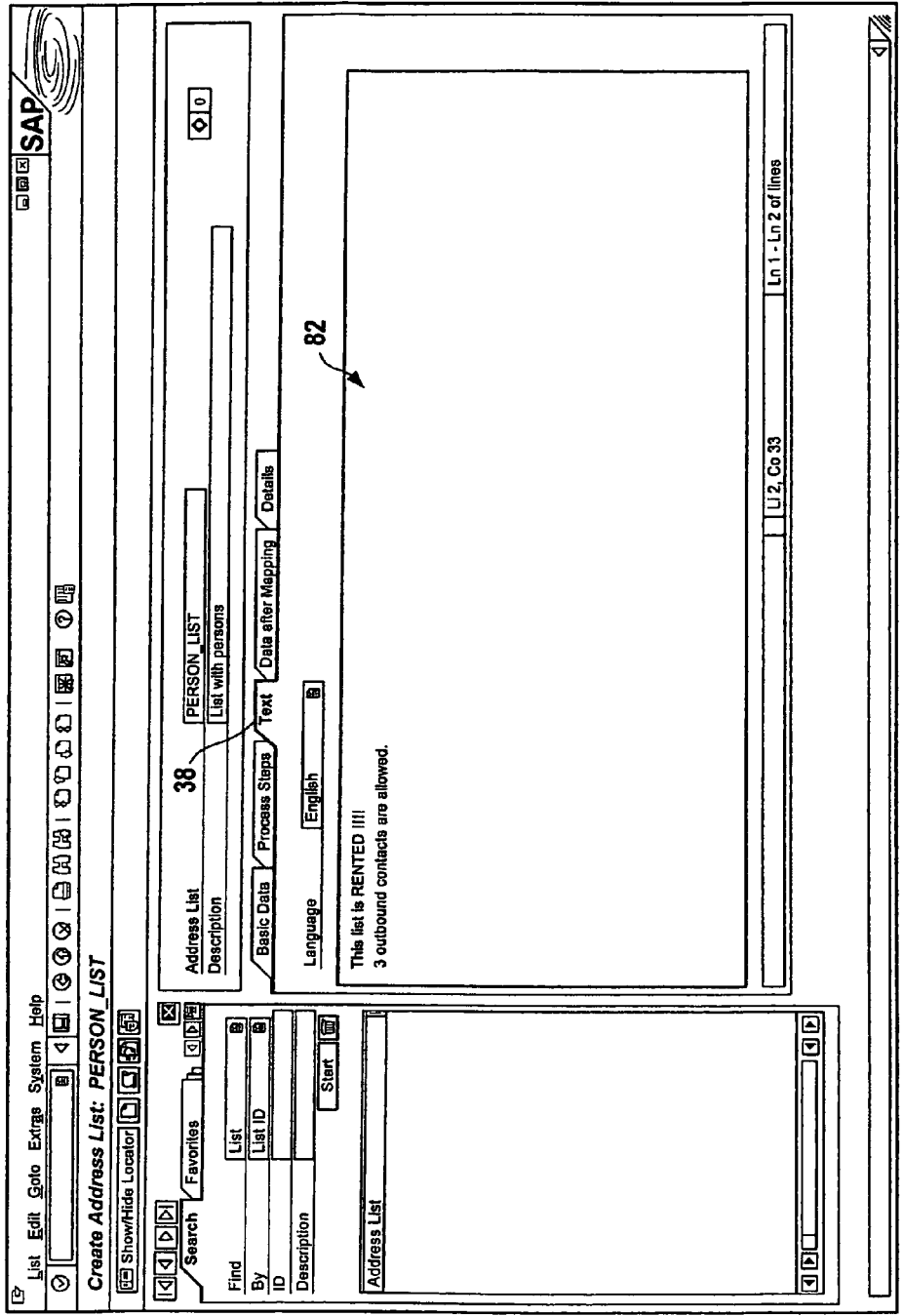

FIG. 3C shows a screen for inputting additional information relating to the list to be imported. On tab strip 38 there is provided a field 82 into which the user can enter a long text.

In the following several examples for processing are given.

The user marks the upload step (field 66), gives a start date/time (field 80) and saves the list (button 78). The file is read from application server and its content is stored in table CRMD_MKTLIST_C. in particular the data sets stored in the data file are read data set by data set and written into table CRMD_MKTLIST_C.

In table CRMD_MKTLIST_S the status of step U ('upload') is updated. If errors occur the step can be repeated. In that case only those data sets of the file are processed which were not transferred to CRMD_MKTLIST_C earlier. If the step was processed without any error it cannot be repeated again.

The user marks the mapping step (field 68), gives a start date/time (field 80) and saves the list (button 78). Once the input by the user is terminated and/or the start time is reached, the processing starts. The previously uploaded data is read from table CRMD_MKTLIST_C data set by data set, mapped and stored in the other tables of the staging area:
CRMD_MKTLIST_ORG
CRMD_MKTLIST_PER
CRMD_MKTLIST_ADR
CRMD_MKTLIST_CEN In particular, an iterative processing takes place in which respective data segments of each data set are read and subsequently written into one of the above tables.

In table CRMD_MKTLIST_S the status of step M ('mapping') is updated. In table CRMD_MKTLIST_I the items are inserted. If errors occur the step can be repeated for all data sets or only for the erroneous. At start of the repetition for all data sets the entries in CRMD_MKTLIST_E, CRMD_MKTLIST_ADR, CRMD_MKTLIST_ORG, CRMD_MKTLIST_PER and CRMD_MKTLIST_CEN are deleted for the repeated data sets. New entries in CRMD_MKTLIST_E, CRMD_MKTLIST_ADR, CRMD_MKTLIST_ORG, CRMD_MKTLIST_PER and CRMD_MKTLIST_CEN are created during the processing. The entries in CRMD_MKTLIST_I are updated only.

In case of repetition for erroneous data sets, only those data sets that are marked as erroneous (in table CRMD_MKTLIST_E) and those data sets that were not processed in previous execution are processed again. Entries in CRMD_MKTLIST_E are deleted just before creating new entries.

The user marks the step for postal check (field 70), gives a start date/time (field 80) and saves the list (button 78). Once the input by the user is terminated and/or the start time is reached, the processing starts. The previously mapped data is read from tables of the staging area
CRMD_MKTLIST_ORG
CRMD_MKTLIST_PER
CRMD_MKTLIST_ADR
CRMD_MKTLIST_CEN
and checked against postal reference data. In table CRMD_MKTLIST_S the status of step P ('Postal Check') is updated. In table CRMD_MKTLIST_I the items are updated, field POSTAL is filled. This step is optional for the processing of the data.

If errors occur the step can be repeated for all data sets s or only for the erroneous. At start of the repetition the entries in CRMD_MKTLIST_E are deleted for the repeated data sets. New entries in CRMD_MKTLIST_E are created during the processing. The entries in CRMD_MKTLIST_I are updated only.

The user marks the step for duplicate check (field 72), gives a start date/time (field 80) and saves the list (button 78). Once the input by the user is terminated and/or the start time is reached, the processing starts. The previously mapped data is read from tables of the staging area
CRMD_MKTLIST_ORG
CRMD_MKTLIST_PER
CRMD_MKTLIST_ADR
CRMD_MKTLIST_CEN
and checked if data sets of the lists exist already as business partner in the system. In table CRMD_MKTLIST_S the status of step D ('Duplicate Check') is updated. In table CRMD_MKTLIST_I the items are updated, field DUPLICATE is filled. This step is optional for the processing of the data.

If errors occur the step can be repeated for all data sets or only for the erroneous. At start of the repetition the entries in CRMD_MKTLIST_E are deleted for the repeated data sets. New entries in CRMD_MKTLIST_E are created during the processing. The entries in CRMD_MKTLIST_I are updated only.

Figure 3D:
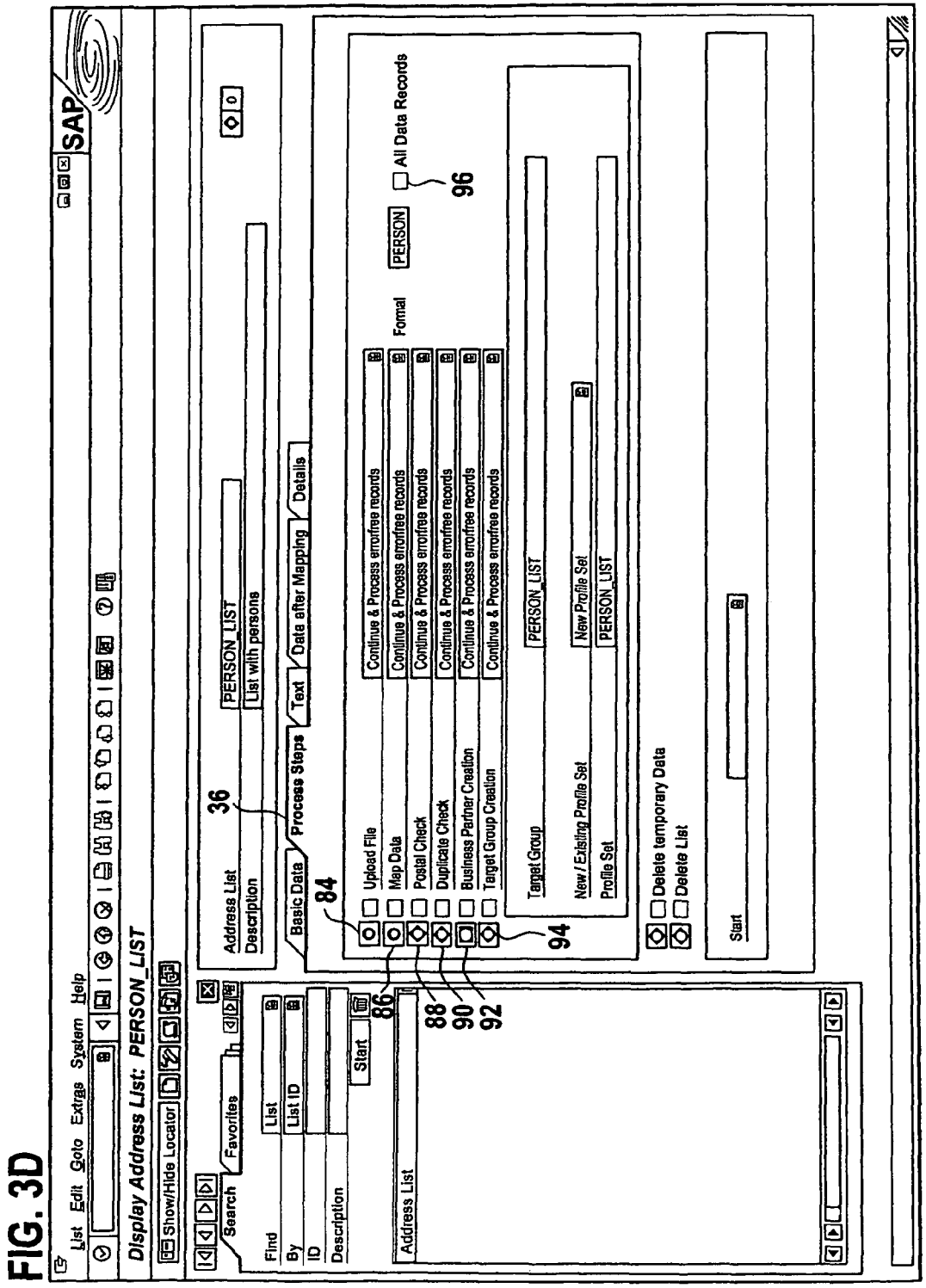

FIG. 3D shows a corresponding to the screen shown in FIG. 3B after the processing of the data has taken place in which tab strip 36 is visible.

After the marked steps are processed a traffic light 84-92 shows if errors occurred. By pressing the button associated with the traffic light 84-92 a popup window with detailed messages appears (see e.g. FIG. 3F).

The processing of the steps can be repeated, the user must mark the step again. For some steps the user can mark a second flag 94. If this flag 94 is marked all data sets are processed again, otherwise only the erroneous data sets are processed again.

A summary log with status information of all processed steps can be opened by pressing the log button 96 (see FIGS. 3A and 3E).

FIG. 3E shows a summary log about status information of all processed steps and FIG. 3F shows a popup with detailed error information of a selected step.

FIG. 3G shows a screen with the tab strip 40. After the step 'Map Data' (to be described later in detail) is processed the result can be checked on this tab strip 40.

Figure 3H:
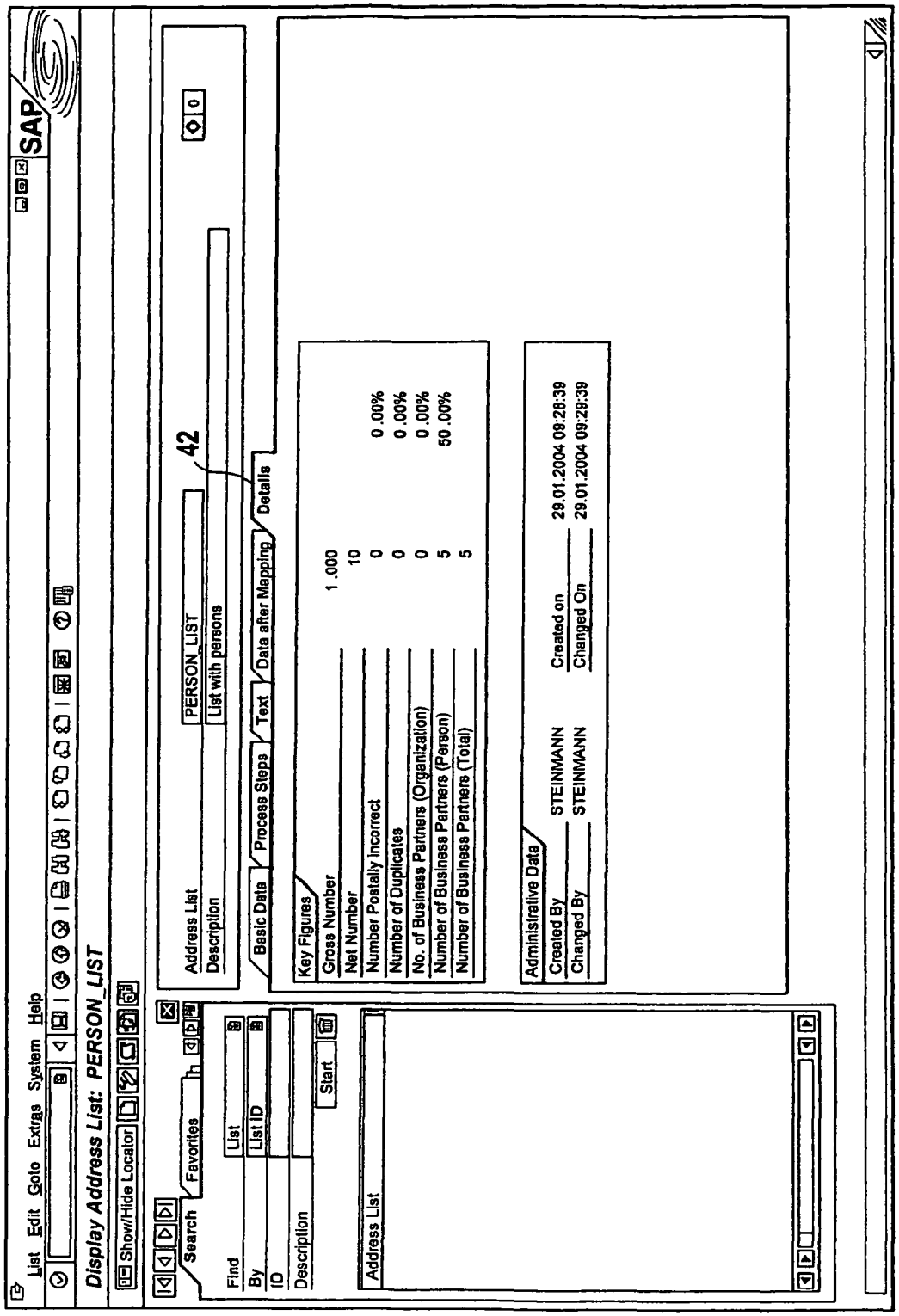

In FIG. 3H shows a screen with the tab strip 42. Here some key figures and administrative data are shown.

The processed data stored in the tables of the staging area can be use used in the user system for creating data objects for each data set. These data objects can then be further processed in the user system.

If a data object is created for a data set, a reference to the created data object is stored in the table CRMD_MKTLIST_I. The created data object is preferably stored centrally in the user system to be accessible for a plurality of applications. Table CRMD_MKTLIST_I establishes a link between the data sets stored in the staging area and the centrally stored data object.

In the following a User Interface for mapping the read data sets stored in table CRMD_MKTLIST_C will be described with reference to FIGS. 4A to 4D. FIGS. 4A to 4D show screen-shots of a graphical user interface provided for the mapping function.

Before a data list can be mapped a mapping format must be defined.

Figure 4A:
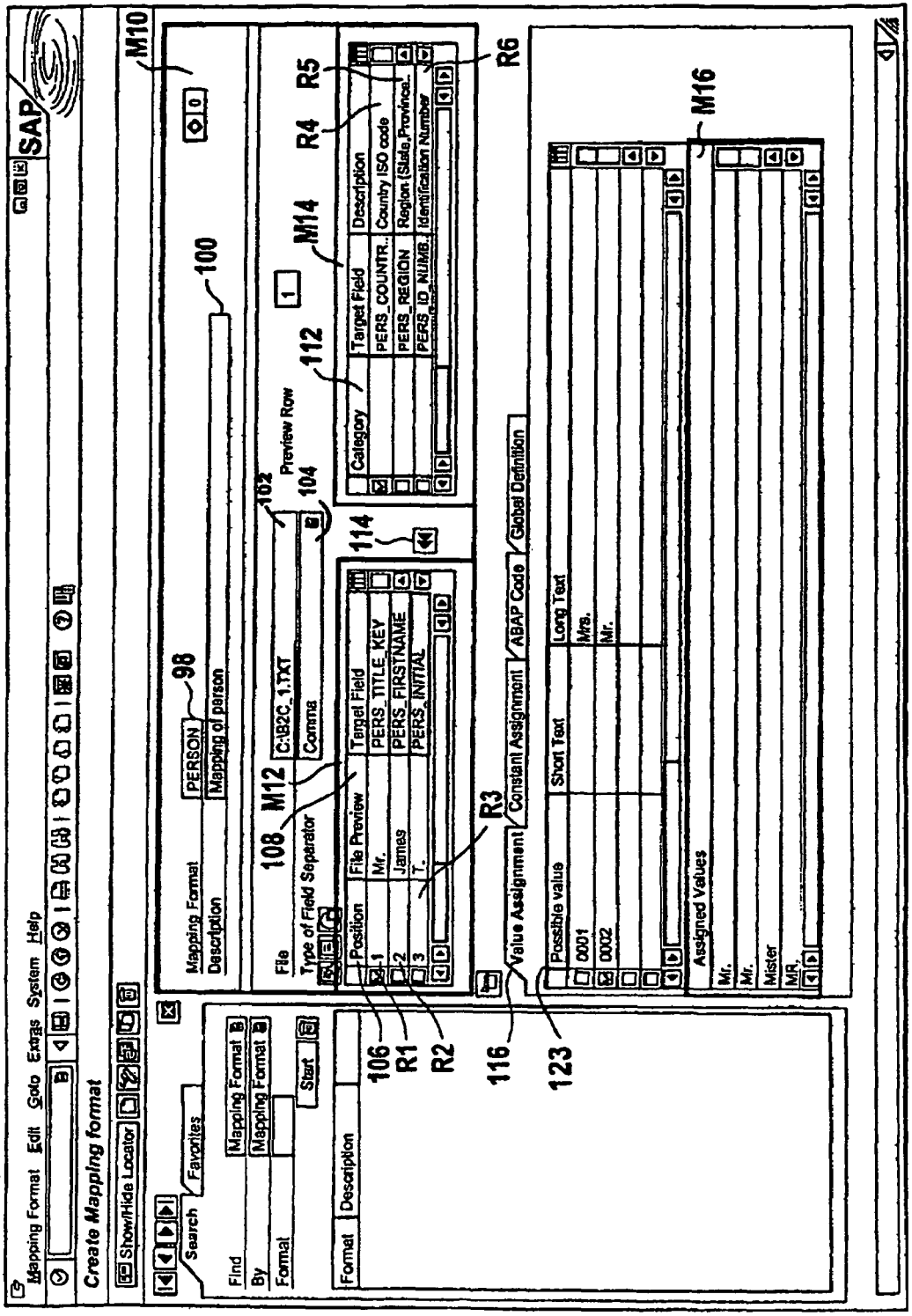
FIGS. 4A-4D show screen-shots of a user interface provided for a mapping function.

FIG. 4A shows a screen in which the user can edit some or more mapping features.

In the general section M10 there is provided a field 98 for inputting an ID of a mapping format to be used. A predefined mapping format previously stored can be used. Alternatively, a new mapping format can be created or an existing mapping format can be edited. Furthermore, in the field 100 a text description of the mapping format can be entered.

The file name of the imported file is entered in the filed 102. Furthermore, the type of field separator is to be chosen in field 104.

Moreover, there are table controls M12 and M14 placed side to side. The table control M12 on the left (segment display section) has three fields 106, 108, 110 in which a position (column number of data segment in the imported file), a file preview (data segment of one data set in the file) and/or the target field name which indicates the target field to which the respective data segment is to be associated are displayed, respectively.

When creating a new mapping format this table control M12 is empty. When the data file for which the mapping format is to be used is selected, the file contents is read depending on the file separator selected. If a correct separator is selected the data is read and shown to the user in table control M12 with each row R1, R2, R3 in the table control M12 showing individual column values (data segments) of one data set of the data file in field 108. Since its only a preview, the first line of the data set is read and placed in the table control M12. If the user had chosen an invalid separator, the whole data set (first line) is shown in one single row (the first row R1 of the table control M12).

The table control M14 on the right (target display section) shows possible target fields defined in the staging area and their description. In the left table control M12 for every column (position) in the file a target field can be assigned in field 110.

A category column (field 112) appears in this control M14, which clearly demarcates the target fields which belong to an organization, organization address, person, person address and contact person function, in the case if address data are used. In case other types of data are used, other specifications can be given for the target fields. This table control displays only target fields.

Since now the user knows the file content for which the mapping has to be done, he can choose the target field by marking one of rows R4-R6 on the table control M14 and the source field by marking one of rows R1-R3 on the table control M12) and press the move button 114 which appears between these controls M12, M14.

Some target fields only allow predefined values defined in a customizing table. For those target fields a value mapping can be defined as will be described hereinafter. For the value assignment the tab 116 is provided.

As shown in FIG. 4A, for the data segment "PERS_TITLE_ KEY", i.e. the title of the person, in the user system the values 0001 and 0002 are provided (column 123), 0001 representing "Mrs." and 0002 representing "Mr.". In the data sets provided, e.g. the title of a person is indicated by the usual expressions Mrs. and Mr. Therefore, these usual expressions need to be substituted by the values used in the user system when importing the data sets into the user system.

Moreover, it is possible to assign a plurality of expressions used in the imported data sets to a specified (predetermined or predeterminable) value in the user system. A table control M16 is provided where the user can assign multiple values to the possible values of the mapped field. In the present example, the expressions "Mr.", "Mr", "Mister" and "MR" are all assigned to the value 0002 representing "Mr." in the user system.

Furthermore, there can be provided a field in which all possible values of a particular data segment of all data sets of a file for which value mapping is to be provided are displayed (not shown in FIG. 4A). Thus, the user can see all possible expressions used in the data file and assign these respectively to the values given in the user system.

Figure 4B:
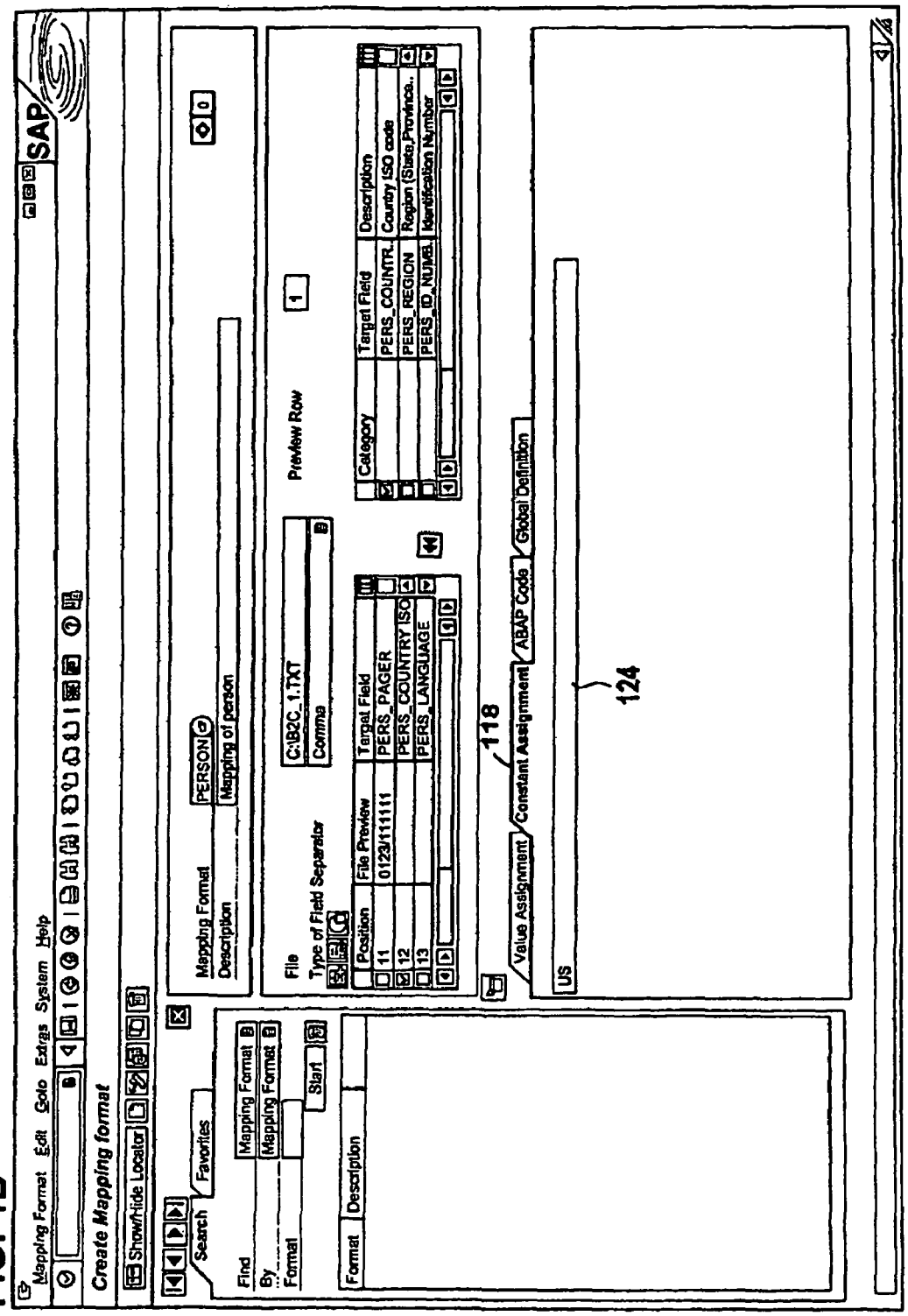

FIG. 4B shows a screen corresponding to the screen of FIG. 4A, wherein the tab 118 is visible.

For those target fields that should have the same value for all data sets in the file a constant assignment can be defined.

The constant assignment can be used if all data sets of the data list should have the same value for a particular field. For example a data list has data sets only from the United States but the country information is not part of the file. The country field is assigned to the mapping format and the constant value US is assigned to this field.

On tab strip 118 in field 124 the user can input the constant value to be assigned to all data sets.

Figure 4C:
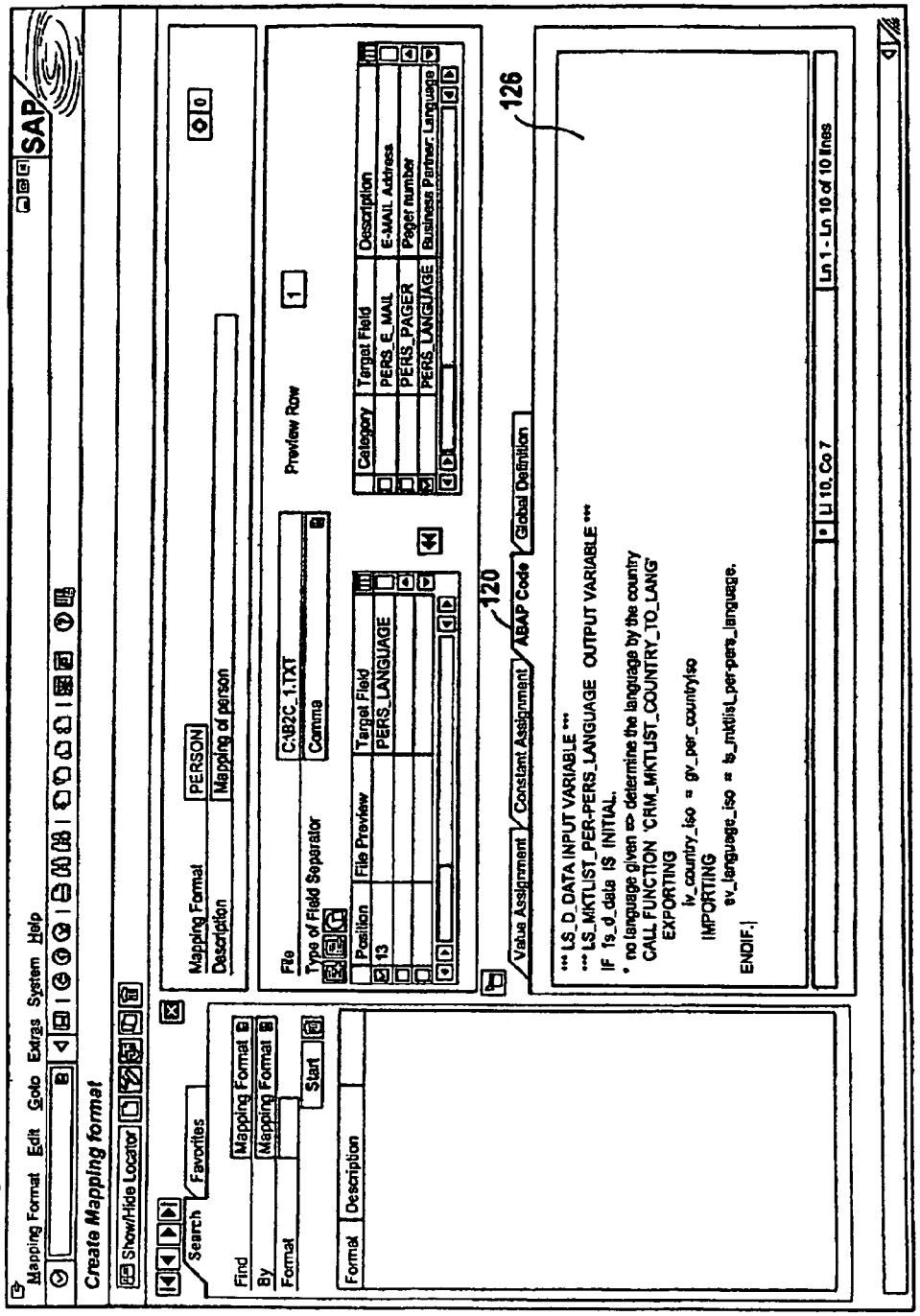

FIG. 4C shows a screen corresponding to the screen of FIG. 4A, wherein the tab 120 is visible.

For those target fields that need a more complex mapping algorithm, a code can be programmed in field 126. In the shown user interface a so called "ABAP code" (Advanced Business Application Programming) can be defined.

The user interface does not allow the user to select this tab 120 unless and until the user selects a mapped field from the table control M14, which holds the mapping fields. Now, the user can see the names of the input structure and the output structure (this is like input parameter and output parameter of a function module). The user can write executable routines in ABAP Code for this mapping field in this control. Care must be taken that the values that come in, are always in the input parameter and the output after the conversion should be assigned to the output parameter.

In the present example, the file contains no column with language information. Via coding the language information is derived from the country information.

Figure 4D:
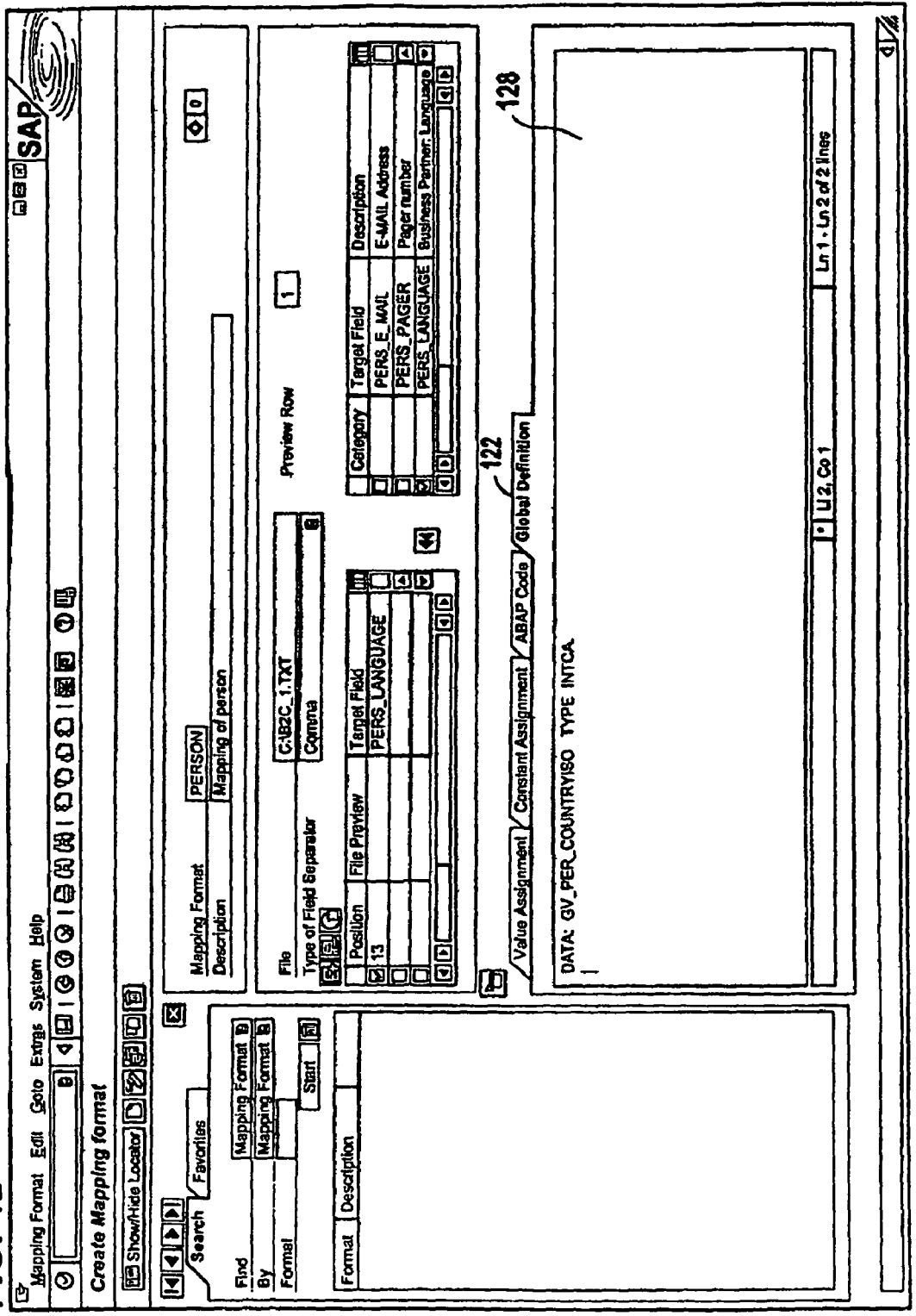

FIG. 4D shows a screen corresponding to the screen of FIG. 4A, wherein the tab strip 122 is visible.

If global variables are needed for the ABAP coding they can be defined in tab strip 122 in field 128.

The processing of the data is preferably done in a parallel manner. This means in particular that a main process calls at least two sub-processes which each process parts of the data, said parts of the data being different from each other. The processing is preferably done in parallel running asynchronous remote function calls (aRFC). The user can select whether the processing is to be done in a parallel manner or not. The parallel processing can be selected for each processing step, i.e. uploading, mapping, postal check, etc., separately.

By using locks, data sets can be processed by a plurality of sub-processes. Furthermore, it can be securely prevented that other processes access the data sets while they are being processed by the sub-processes.

Figure 5A:
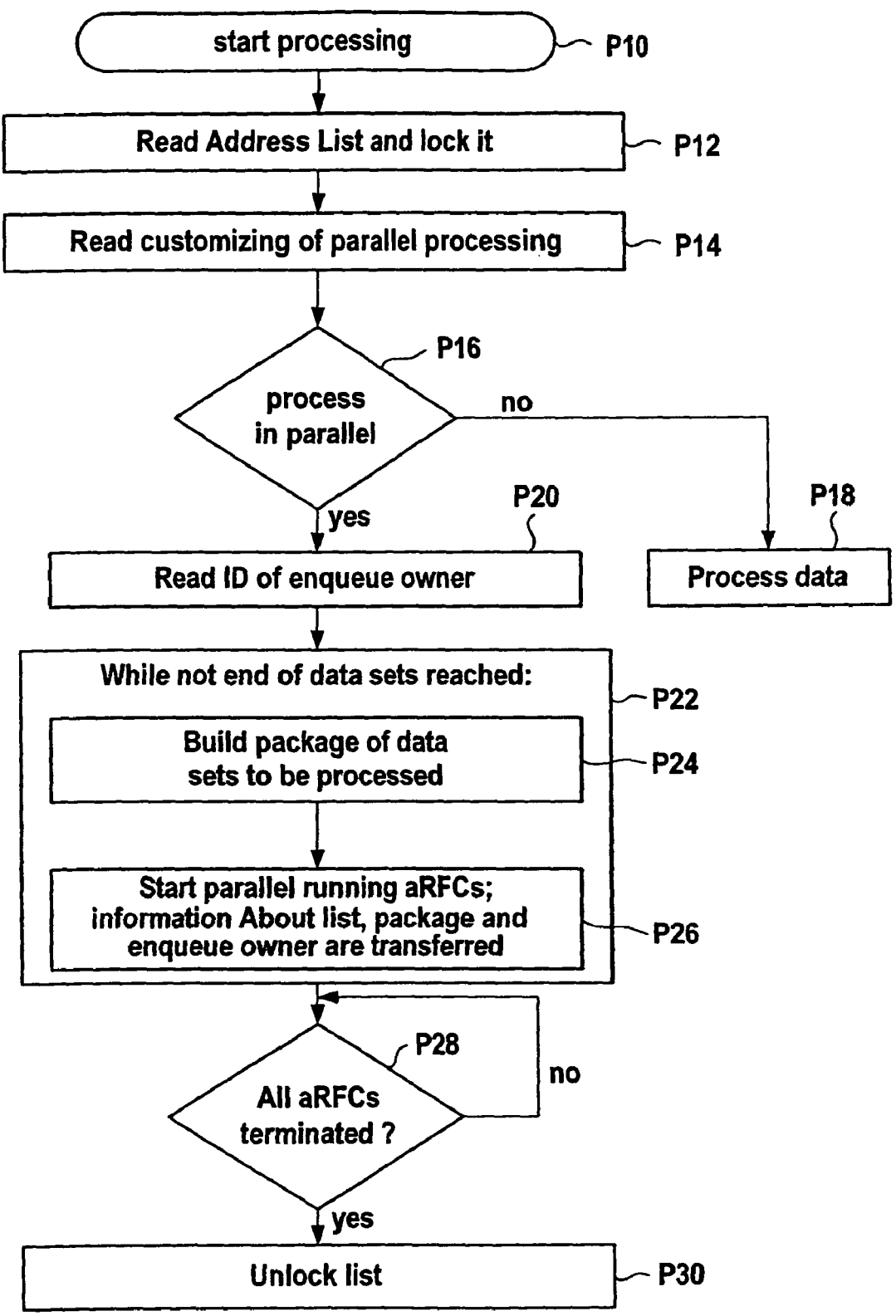
FIG. 5A shows a flowchart describing parallel processing in a main process.
Figure 5B:
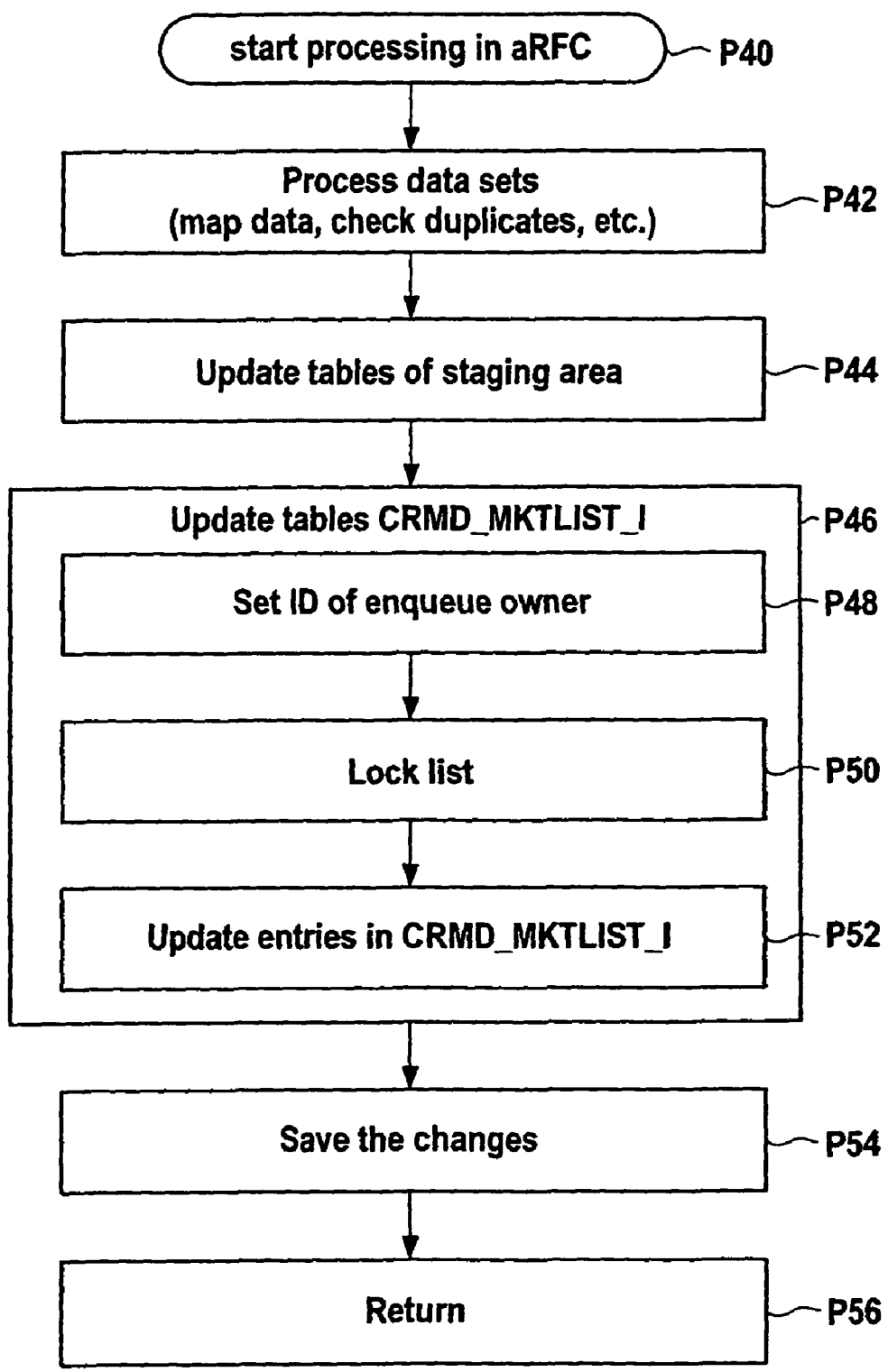
FIG. 5B shows a flowchart describing processing in a sub-process of FIG. 5B.

The method of parallel processing will be described with reference to FIGS. 5A and 5B. FIG. 5A shows a flowchart describing parallel processing in a main process and FIG. 5B shows a flowchart describing processing in a sub-process of FIG. 5A.

In step P10 a processing step, e.g. uploading, mapping, postal check, etc., is started. The data list to be processed is read and locked (step P12) by the main process. An ID of a lock is created. The locking prevents that the associated data list is accessed by another process at the same time. Locking the data to be processed in particular comprises providing the data with a predefined marker which indicates that the respective data can only be accessed and/or processed by the owner of the lock, i.e. the process which possesses the ID of or associated to the lock. By transmitting different parts of the data and the lock to sub-processes, and thus processing the data substantially in parallel, the processing speed can be enhanced as the system resources can be used in a better way.

Then, the customizing of the parallel processing is read (step P14). The user can e.g. customize if parallel processing should be used and how many parallel running processes should be started. In step P16 it is determined whether a parallel processing is to be done or not. If data is not to be processed in parallel ("no" in step P16), the data is processed by the main process (step P18). If data is to be processed in parallel ("yes" in step P16), the main process reads the ID of the enqueue owner (step P20). The ID of the enqueue owner corresponds to the ID of the lock with which the list has been locked. If any tables are to be updated or changed, the lock ID is needed.

In step P22 a loop is carried out as long as the end of the data sets is not reached. In this loop, in step P24 packages of data sets of the data list to be processed are built. In step P26 the parallel running sub-processes (aRFCs) are started. Information about the list to be processed, the package of data sets to be processed by the respective sub-process, and the enqueue owner (information about the lock, lock ID) are transmitted to the sub-process.

In step P28, it is determined whether all aRFCs have terminated the processing. If not all aRFCs have yet terminated the processing ("no" in step P28), the determination is repeated. If all aRFCs have terminated the processing ("yes" in step P28), the list is unlocked by the main process.

Now processing of data in a sub-process will be described with reference to FIG. 5B.

In step P40 the processing in an aRFC is started and data sets are processed in step P42.

After the data sets have been processed, the tables of the staging area are updated (step P44), i.e. the processed data is written into the tables and administrative information is updated.

In step P46 the table CRMD_MKTLIST_I is updated, i.e. during processing the step "Postal Check" the filed POSTAL is filled. During the update, the ID of the enqueue owner is set in step P48. This ensures that in step P50 the list can be locked with the same lock ID it was originally locked in the main process. Only if the list can be locked the entries of CRMD_MKTLIST_I are updated in step P52.

Subsequently the changes are saved in step P54 and the aRFC is terminated and returns to the main process (step P56).

As described above, every aRFC process the data sets of the given package and brings the data into the staging area.

All locks are stored in a global table. This table is located in the main memory of a server of the system. All processes of the system have access to that global table by a service offered by the kernel of the system. This service, preferably an application program interface (API) called by the processes, offers a kind of write access. The access to the global table is a follows: A process wants to lock an object and calls this service. If the lock request is successful, the requester gets a positive return code (i.e. value=0) and the service locks the object by making an entry in the global table. If the lock request is not successful, the requester gets a negative response (i.e. value≠0). In this case, there already exists an entry in the global lock table for this object.

The above description has been given for the importing and processing of address data set into a user system. However, other types of data can also be processes by the described structures. Such data could e.g. be measurement data which are to be evaluated in an evaluation system.

LIST OF REFERENCE NUMERALS

| | |
|---|---|
| 10 | user system |
| 12 | first section |
| 14 | second section |
| 30 | field |
| 32 | field |
| 34-42 | tab strip |
| 44-60 | field |
| 62, 64 | region |
| 66-76 | field |
| 78 | save button |
| 80, 82 | field |
| 84-92 | traffic light |
| 94 | flag |
| 96 | log button |
| 98-112 | field |
| 114 | move button |
| 116-122 | tab strip |
| 124-128 | field |
| M10-M16 | table control |
| R1-R6 | row |

The invention claimed is:

1. A method for processing data, the method comprising:
receiving, in a computer system, a data collection that is to be processed;
creating an administration table for the data collection;
locking, by a main process in the computer system, the data collection against unauthorized access by creating an association in a lock table between the data collection and a lock identifier, wherein access to the data collection by any of multiple processes requires possession of the lock identifier;
dividing, by the main process, the data collection into subgroups for processing;
for each of the subgroups, forwarding the lock identifier and the subgroup for receipt by one of the multiple processes;
the subgroups being processed by respective recipient processes substantially in parallel, each of the recipient processes: (i) updating the data collection as a result of the processing, the recipient process accessing the data collection using the lock identifier, and (ii) setting the lock identifier and updating the administration table regarding the processing done by the recipient process, the administration table being common to all of the subgroups; and
when the recipient processes are finished processing, unlocking the data collection, by the main process, by removing the association between the data collection and the lock identifier in the lock table.

2. The method of claim 1, wherein the lock table is accessible for all of the multiple processes.

3. The method of claim 1, further comprising receiving an input specifying a number of the multiple processes to be used.

4. The method of claim 1, further comprising receiving an input specifying an amount of data to be processed by each of the recipient processes.

5. The method according to claim 1, further comprising generating the lock identifier before locking the data collection.

6. A computer program product stored in storage medium, the computer program product including instructions that, when executed, cause a processor to perform operations comprising:
  receiving, in a computer system, a data collection that is to be processed;
  creating an administration table for the data collection;
  locking, by a main process in the computer system, the data collection against unauthorized access by creating an association in a lock table between the data collection and a lock identifier, wherein access to the data collection by any of multiple processes requires possession of the lock identifier;
  dividing, by the main process, the data collection into subgroups for processing;
  for each of the subgroups, forwarding the lock identifier and the subgroup for receipt by one of the multiple processes;
  the subgroups being processed by respective recipient processes substantially in parallel, each of the recipient processes: (i) updating the data collection as a result of the processing, the recipient process accessing the data collection using the lock identifier, and (ii) setting the lock identifier and updating the administration table regarding the processing done by the recipient process, the administration table being common to all of the subgroups; and
  when the recipient processes are finished processing, unlocking the data collection, by the main process, by removing the association between the data collection and the lock identifier in the lock table.

7. A computer device for processing data comprising:
at least one storage medium having stored therein a data collection that is to be processed and a lock table; and
a processor configured to execute a main process to:
  lock the data collection against unauthorized access by creating an association in the lock table between the data collection and a lock identifier, wherein access to the data collection by any of multiple processes requires possession of the lock identifier;
  create an administration table for the data collection;
  divide the data collection into subgroups for processing;
  for each of the subgroups, forward the lock identifier and the subgroup for receipt by one of the multiple processes;
  the subgroups being processed by respective recipient processes substantially in parallel, each of the recipient processes: (i) updating the data collection as a result of the processing, the recipient process accessing the data collection using the lock identifier, and (ii) setting the lock identifier and updating the administration table regarding the processing done by the recipient process, the administration table being common to all of the subgroups; and
  when the recipient processes are finished processing, unlock the data collection, by the main process, by removing the association between the data collection and the lock identifier in the lock tab.

* * * * *